June 27, 1933.  J. J. PAUGH  1,915,947
WATER COOLED WELDING ELECTRODE
Filed April 29, 1929

INVENTOR.
JAMES J. PAUGH
BY
ATTORNEY.

Patented June 27, 1933

1,915,947

UNITED STATES PATENT OFFICE

JAMES J. PAUGH, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

WATER-COOLED WELDING ELECTRODE

Application filed April 29, 1929. Serial No. 358,826.

My invention relates to welding electrodes and more particularly to water-cooled welding electrodes adapted for use in spot welding machines.

Heretofore such electrodes have been made hollow to a point adjacent the welding point to secure proper cooling thereof, thereby necessitating, in order to obtain a sufficient flow of cooling fluid, as water, to the welding point, a relatively large diameter. This resulted in a wastage of copper in two ways, first, after the welding point was worn down close to the cooling chamber, it had to be discarded and another substituted, and second, to keep the point of an area suitable for efficient spot welding, it was necessary to do considerable filing on the point from time to time. Both of these ways, namely, the changing of the welding point and the replacement of it by another and the filing of the point, required rather frequent stoppage of the machine for considerable intervals of time, the total of these stoppages, when added together over a period of time, amounting to a considerable period during which the machine was idle.

It is an object of my invention to provide a welding electrode which obviates in large degree these delays and this wastage of copper, and yet one which can be efficiently cooled.

To this end, I provide an electrode having a relatively large diameter body portion, as heretofore, which is adapted to be secured to an arm of an electric welding machine and which has means for cooling it associated therewith, and I mount in such body portion, so as to extend through an opening therein, whereby it comes into close association with the cooling chamber, a relatively small diameter member or rod carrying a welding point. The welding point of this member preferably does not extend far beyond the body portion of the electrode so that the heat from the point may be readily conveyed to the body portion and there cooled. In a preferred form of my invention, I make this member a screw-threaded rod of copper or other highly conductive metal which is mounted in the body portion of the electrode by screwing it into a correspondingly screw threaded opening provided therein, the screw threaded engagement giving a large area of contact between the body portion and point carrying member and thus insuring a rapid transfer of heat and electric current. The screw threaded engagement also permits the easy achievement of another object of my invention, namely, ready relative longitudinal adjustment between body portion and welding point carrying member, whereby to compensate for wear of the latter.

Other and further objects and advantages of my novel improved electrode will become apparent from the following detailed description when read in the light of the accompanying drawing forming a part of this specification.

Figures 1, 2:
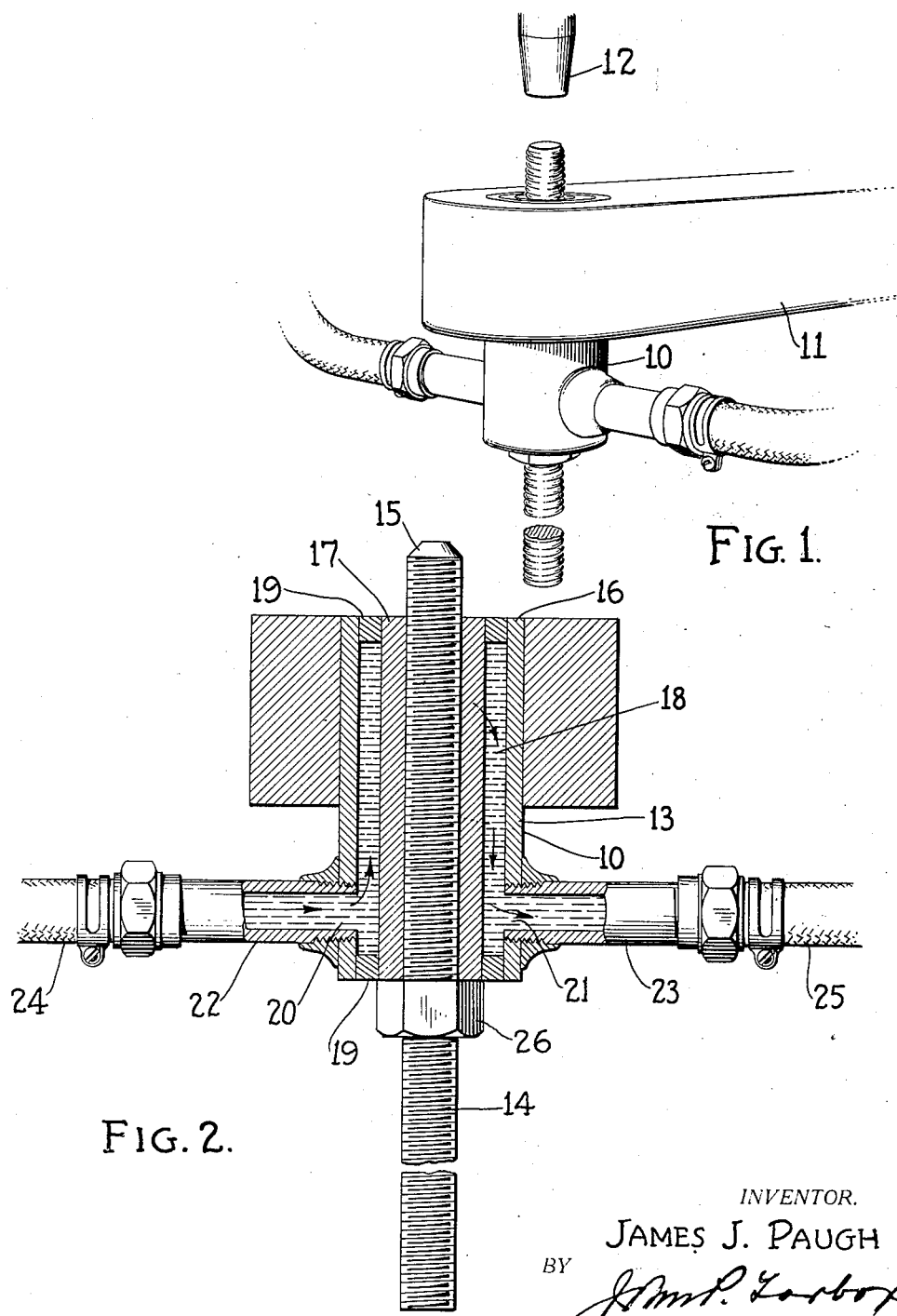
Fig. 1 is a perspective view showing the electrode of my invention applied to the lower arm of a spot welding machine.
Fig. 2 is a longitudinal central sectional view, the section being taken through the body portion of the electrode and arm of the welding machine in which it is mounted.

In the form of the invention shown, the novel electrode 10 of my invention is shown mounted in the lower fixed arm 11 of an electric spot welding machine, it being secured in this arm in any usual or other manner, the manner in which the electrode is secured to the welding machine forming no part of the present invention. A similar electrode may also be mounted in the upper or movable arm of the machine, represented in the drawing, by the upper welding point, numbered 12.

The novel electrode 10 may comprise, as shown, the main body portion 13 through which the electrode is mounted on the machine and the longitudinally adjustable member or rod 14 carrying the welding point 15.

The main body portion of the electrode is conveniently built up out of an outer copper tube 16 and an inner copper tube 17 providing a space 18 between them forming a cooling chamber. At their ends the tubes 16 and 17 are joined by the annular closure members 19 forming the end walls of the cooling chamber 18. Parts 17 and 19 may conveniently be secured together to form a strong water-tight chamber by brazing or the like.

The water circulating system by this construction is connected only with the body portion 10 of the electrode which may be made of a form to fit any type of welding machine, and may be detachably or permanently fixed thereto as desired. To obtain a circulation of the water for cooling through the chamber 18, I have provided entrance and exit parts 20 and 21 on opposite sides of the tube 16, into which are screwed the nipples 22 and 23, respectively, which in turn connect with the flexible conduits 24 and 25 of the water-circulating system.

The member or rod 14 carrying the welding point fits the opening through the tube 17 and is secured therein against endwise movement. Its end carrying the welding point 15 projects but a short distance beyond the body portion of the electrode, so that the heat developed at the welding point is rapidly conducted away to the cooler body portion 13, which is constantly cooled by the circulation of the cooling fluid in the chamber surrounding the tube 17 and rod 14. To secure a large area of contact between the tube 17 and the electrode rod 14 I form the rod 14 with the usual V-form screw threads, and the inner bore of the tube 17 with corresponding threads. The large area of contact so attained facilitates the cooling of the point 15 and also provides for the free flow of the welding current. Another advantage of the screw threaded arrangement is that it provides means for readily adjusting the welding point carrying rod longitudinally of the body portion 13 of the electrode to compensate for wear, or if it is for any other reason desired to effect such an adjustment. To lock these parts in adjusted position and also exert a clamping action to draw the thread surfaces of the tube 17 and rod 14 into firm contact, should the threaded connection become loose due to the wear after the body portion has been long in service, I provide a lock nut, as 26, screwed onto the rod 14, and engaging one end of the body portion 13 of the electrode 10.

If the electrode of my invention needs sharpening to secure a more rapid and efficient welding action, the relatively small diameter rod may readily have its point 15 sharpened by a few strokes of a file, and with very little waste of copper. If it needs adjustment for wear, this can be promptly accomplished by backing off the nut 26 and applying a Stillson wrench to the rod to rotate it a direction causing a feeding movement thereof. The rod 14 can be made any suitable length convenient in the relation in which it is used, and will thus last for a long period of time where a long rod does not interfere with operation of other parts of the machine. The body portion 13, the electrode, being preferably relatively short with relation to the length of the rod 14, nearly all of the rod can be used up before a new one need be substituted. The threaded rod can be produced in convenient length for shipment and cut into convenient length for use at the welding machine.

From the foregoing description, it will be obvious that by my invention, I achieve a welding electrode which can be manufactured at low cost and provides a decided saving in operating costs, and which is very efficient in operation.

While I have shown a specific form of the invention, by which all of these advantages are attained in a high degree, it will be understood that changes and modifications within the spirit of my invention will occur to those skilled in the art, and I desire it to be understood that my invention includes all such changes and modifications as fall within the spirit and scope of the appended claims.

What I claim is:

1. A welding electrode comprising a hollow body portion adapted to be supported from an arm of a welding machine and having a screw threaded central opening, a threaded member carrying a welding point integral therewith engaged in said opening to form an extended area of electrical contact, and adjustable longitudinally by relative rotation of said body portion and member, and means for locking said member in adjusted position, by increase of frictional engagement between said threaded opening and said threaded member throughout their contacting areas.

2. A water-cooled spot welding electrode comprising concentric hollow cylindrical elements sealed at the ends to form a hollow annular housing, fluid inlet and outlet devices secured to said outer element, said inner element having its radially inner wall threaded substantially throughout and a threaded elongated conducting member arranged for locking adjustment longitudinally therein.

3. A spot welding electrode assembly comprising an elongated substantially hollow metal toroid arranged for cooling fluid circulation therethrough and having its radially inward wall screw threaded throughout and an elongated electrode arranged for adjustable securement therein being cooled throughout the length of said toroidal.

4. A welding electrode assembly including an electrode and a cooling housing comprising an elongated annular hollow metal member of hollow rectangular cross section having a threaded central opening, and said electrode correspondingly threaded for longitudinal engagement therein and thereby providing a spiral cooling fin interposed between said electrode and said housing.

In testimony whereof I hereunto affix my signature.

JAMES J. PAUGH.